United States Patent
Xu et al.

(10) Patent No.: US 9,379,427 B2
(45) Date of Patent: Jun. 28, 2016

(54) METHODS FOR MANUFACTURING AN ANTENNA TUNING ELEMENT IN AN ELECTRONIC DEVICE

(71) Applicant: Apple Inc., Cupertino, CA (US)

(72) Inventors: Hao Xu, Cupertino, CA (US); Jayesh Nath, Milpitas, CA (US); Peter Bevelacqua, San Jose, CA (US); Daniel W. Jarvis, Sunnyvale, CA (US); Jared M. Kole, San Jose, CA (US); Jennifer M. Edwards, San Francisco, CA (US); Mattia Pascolini, Campbell, CA (US); Richard H. Dinh, San Jose, CA (US); Robert W. Schlub, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 13/871,996

(22) Filed: Apr. 26, 2013

(65) Prior Publication Data

US 2014/0323063 A1    Oct. 30, 2014

(51) Int. Cl.
| | |
|---|---|
| *H04B 1/38* | (2015.01) |
| *H01Q 1/24* | (2006.01) |
| *H01Q 9/04* | (2006.01) |
| *H04B 1/18* | (2006.01) |
| *H01Q 9/42* | (2006.01) |

(52) U.S. Cl.
CPC ............ *H01Q 1/243* (2013.01); *H01Q 9/0442* (2013.01); *H04B 1/18* (2013.01); *H01Q 9/42* (2013.01)

(58) Field of Classification Search
CPC ............ H03J 5/28; H03H 5/006; H01P 3/006
See application file for complete search history.

(56) References Cited

U.S. PATENT DOCUMENTS

| 6,188,369 B1 | 2/2001 | Okabe et al. |
|---|---|---|
| 8,482,467 B2 | 7/2013 | Jarvis et al. |
| 2006/0114159 A1* | 6/2006 | Yoshikawa ............... H01Q 1/24 343/702 |
| 2008/0316117 A1* | 12/2008 | Hill et al. .................. 343/702 |
| 2012/0119955 A1 | 5/2012 | Milosavljevic et al. |

FOREIGN PATENT DOCUMENTS

| EP | 1962372 | 10/2010 |
|---|---|---|
| WO | 2006043543 | 4/2006 |
| WO | 2012039465 | 3/2012 |

OTHER PUBLICATIONS

Jin et al., U.S. Appl. No. 13/041,934, filed Mar. 7, 2011.
Jin et al., U.S. Appl. No. 13/041,905, filed Mar. 7, 2011.

* cited by examiner

*Primary Examiner* — Wesley Kim
*Assistant Examiner* — Richard Chan
(74) *Attorney, Agent, or Firm* — Treyz Law Group, P.C.; G. Victor Treyz; Michael H. Lyons

(57) ABSTRACT

Custom antenna structures may be used to improve antenna performance and to compensate for manufacturing variations in electronic device antennas. An electronic device antenna may include an antenna tuning element and conductive structures formed from portions of a peripheral conductive housing member and other conductive antenna structures. The antenna tuning element may be connected across a gap in the peripheral conductive housing member. The custom antenna structures may be used to couple the antenna tuning element to a fixed custom location on the peripheral conductive housing member to help satisfy design criteria and to compensate for manufacturing variations in the conductive antenna structures that could potentially lead to undesired variations in antenna performance. Custom antenna structures may include springs and custom paths on dielectric supports.

16 Claims, 12 Drawing Sheets

METHODS FOR MANUFACTURING AN ANTENNA TUNING ELEMENT IN AN ELECTRONIC DEVICE

BACKGROUND

This relates generally to electronic devices, and more particularly, to electronic devices with antennas.

Electronic devices such as computers and handheld electronic devices are often provided with wireless communications capabilities. For example, electronic devices may use long-range wireless communications circuitry such as cellular telephone circuitry to communicate using cellular telephone bands. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

Antenna performance can be critical to proper device operation. Antennas that are inefficient or that are not tuned properly may result in dropped calls, low data rates, and other performance issues. There are limits, however, to how accurately conventional antenna structures can be manufactured.

Many manufacturing variations are difficult or impossible to avoid. For example, variations may arise in the size and shape of printed circuit board traces, variations may arise in the density and dielectric constant associated with printed circuit board substrates and plastic parts, and conductive structures such as metal housing parts and other metal pieces may be difficult or impossible to construct with completely repeatable dimensions. Some parts are too expensive to manufacture with precise tolerances and other parts may need to be obtained from multiple vendors, each of which may use a different manufacturing process to produce its parts.

Manufacturing variations such as these may result in undesirable variations in antenna performance. An antenna may, for example, exhibit an antenna resonance peak at a first frequency when assembled from a first set of parts, while exhibiting an antenna resonance peak at a second frequency when assembled from a second set of parts. If the resonance frequency of an antenna is significantly different than the desired resonance frequency for the antenna, a device may need to be scrapped or reworked.

It would therefore be desirable to provide a way in which to address manufacturability issues such as these so as to make antenna designs more amenable to reliable mass production.

SUMMARY

An electronic device may be provided with antennas. An electronic device may have a display and a peripheral conductive member that surrounds the display. The peripheral conductive member may form a display bezel or housing sidewalls.

The peripheral conductive member and other conductive structures may be used in forming an antenna in the electronic device. An antenna feed having positive and ground antenna feed terminals may be used to feed the antenna. The antenna may include at least one antenna tuning element for tuning antenna performance. The antenna tuning element may include at least one of a radio-frequency switch, a tunable resistive component, a tunable capacitive component, a tunable inductive component, and other suitable adjustable/non-adjustable load components. The antenna tuning element may be dynamically adjusted in real time to compensate for temperature and voltage variations in the electronic device and to tune resonant peaks associated with the antenna.

During manufacturing operations, parts for an electronic device may be constructed using different manufacturing processes and may otherwise be subject to manufacturing variations. If care is not taken, these manufacturing variations can lead to performance variations when the parts are assembled into an antenna.

To compensate for manufacturing variations, custom antenna structures may be included in the antenna of each electronic device. If, for example, a device antenna includes parts that would cause the antenna to exhibit resonance peaks that are lower in frequency than desired, custom antenna structures may be included in the device antenna to alter the performance of the antenna and ensure that the resonance peaks are shifted higher in frequency to their desired position. The custom conductive path in the custom antenna structures may serve to couple the antenna tuning element to the peripheral conductive member of the antenna at a selected one of different custom locations. Each of the different custom antenna structures has a fixed (non-adjustable) configuration that compensates for manufacturing variations in the assembled parts.

For example, if a device antenna includes parts that would cause the antenna to exhibit resonance peaks that are higher in frequency than desired, custom antenna structures may be included in the device antenna to alter the performance of the antenna and ensure that the resonance peaks are shifted lower in frequency to their desired position.

The customized antenna structures may include custom conductive structures such as springs with customized shapes, custom patterns of traces on dielectric support structures, or other custom structures. With one suitable arrangement, the customized antenna structures may include a dielectric support structure on which a custom conductive path is formed. The path may follow different routes on different custom structures. Springs or other conductive members may be used to form electrical connections to opposing ends of the custom conductive path.

Further features of the present invention, its nature and various advantages will be more apparent from the accompanying drawings and the following detailed description.

DETAILED DESCRIPTION

Figure 1:
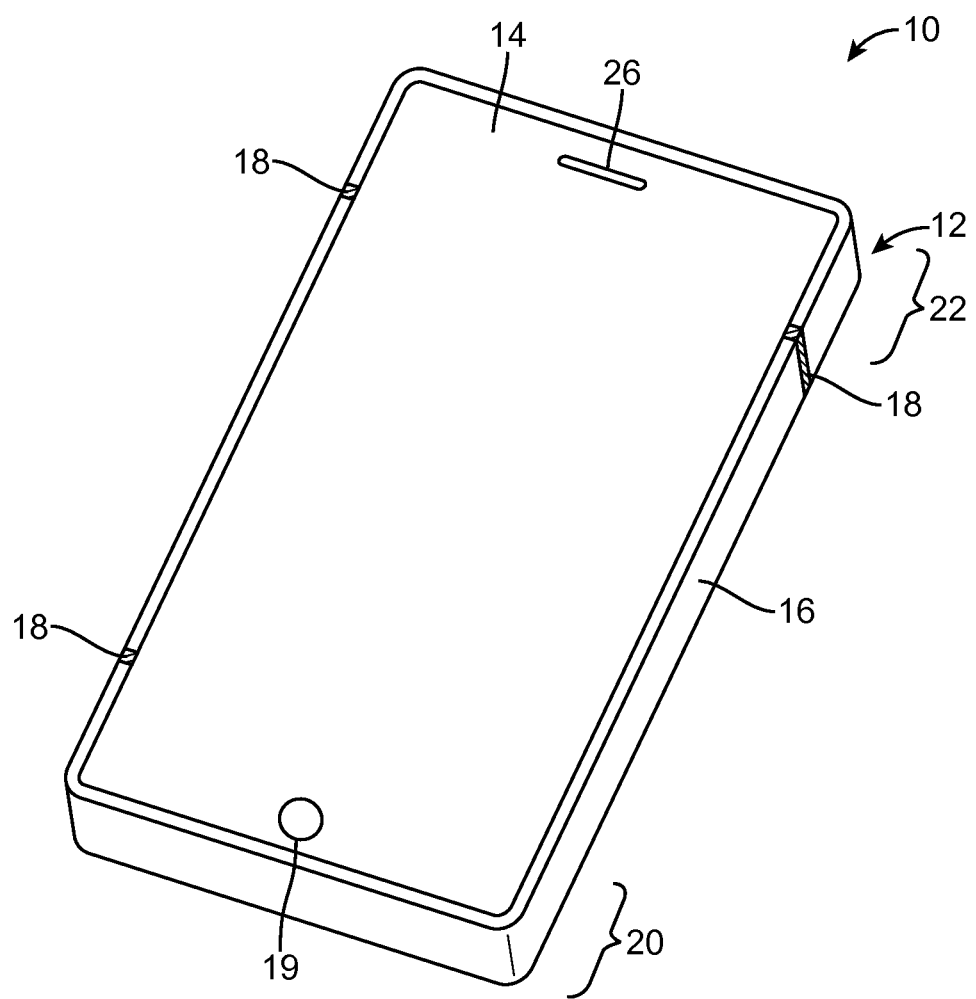
FIG. 1 is a perspective view of an illustrative electronic device with wireless communications circuitry in accordance with an embodiment of the present invention.

Electronic devices such as electronic device 10 of FIG. 1 may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include a peripheral conductive member that runs around the periphery of an electronic device. The peripheral conductive member may serve as a bezel for a planar structure such as a display, may serve as sidewall structures for a device housing, and/or may form other housing structures. Gaps in the peripheral conductive member may be associated with the antennas.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A cover glass layer may cover the surface of display 14. Buttons such as button 19 may pass through openings in the cover glass. The cover glass may also have other openings such as an opening for speaker port 26.

Housing 12 may include a peripheral member such as member 16. Member 16 may run around the periphery of device 10 and display 14. In configurations in which device 10 and display 14 have a rectangular shape, member 16 may have a rectangular ring shape (as an example). Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10 (e.g., by forming a metal band with vertical sidewalls, etc.).

Member 16 may be formed of a conductive material and may therefore sometimes be referred to as a peripheral conductive member or conductive housing structures. Member 16 may be formed from a metal such as stainless steel, aluminum, or other suitable materials. One, two, three, or more than three separate structures may be used in forming member 16.

It is not necessary for member 16 to have a uniform cross-section. For example, the top portion of member 16 may, if desired, have an inwardly protruding lip that helps hold display 14 in place. If desired, the bottom portion of member 16 may also have an enlarged lip (e.g., in the plane of the rear surface of device 10). In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of housing 12 of the sidewalls of housing 12).

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular member that is welded or otherwise connected between opposing sides of member 16), printed circuit boards, and other internal conductive structures. These conductive structures may be located in the center of housing 12 under display 14 (as an example).

In regions 22 and 20, openings may be formed within the conductive structures of device 10 (e.g., between peripheral conductive member 16 and opposing conductive structures such as conductive housing structures, a conductive ground plane associated with a printed circuit board, and conductive electrical components in device 10). These openings may be filled with air, plastic, and other dielectrics. Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations. The arrangement of FIG. 1 is merely illustrative.

Portions of member 16 may be provided with gap structures. For example, member 16 may be provided with one or more gaps such as gaps 18, as shown in FIG. 1. The gaps may be filled with dielectric such as polymer, ceramic, glass, air, other dielectric materials, or combinations of these materials. Gaps 18 may divide member 16 into one or more peripheral conductive member segments. There may be, for example, two segments of member 16 (e.g., in an arrangement with two gaps), three segments of member 16 (e.g., in an arrangement with three gaps), four segments of member 16 (e.g., in an arrangement with four gaps, etc.). The segments of peripheral conductive member 16 that are formed in this way may form parts of antennas in device 10.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or distinct non-overlapping communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
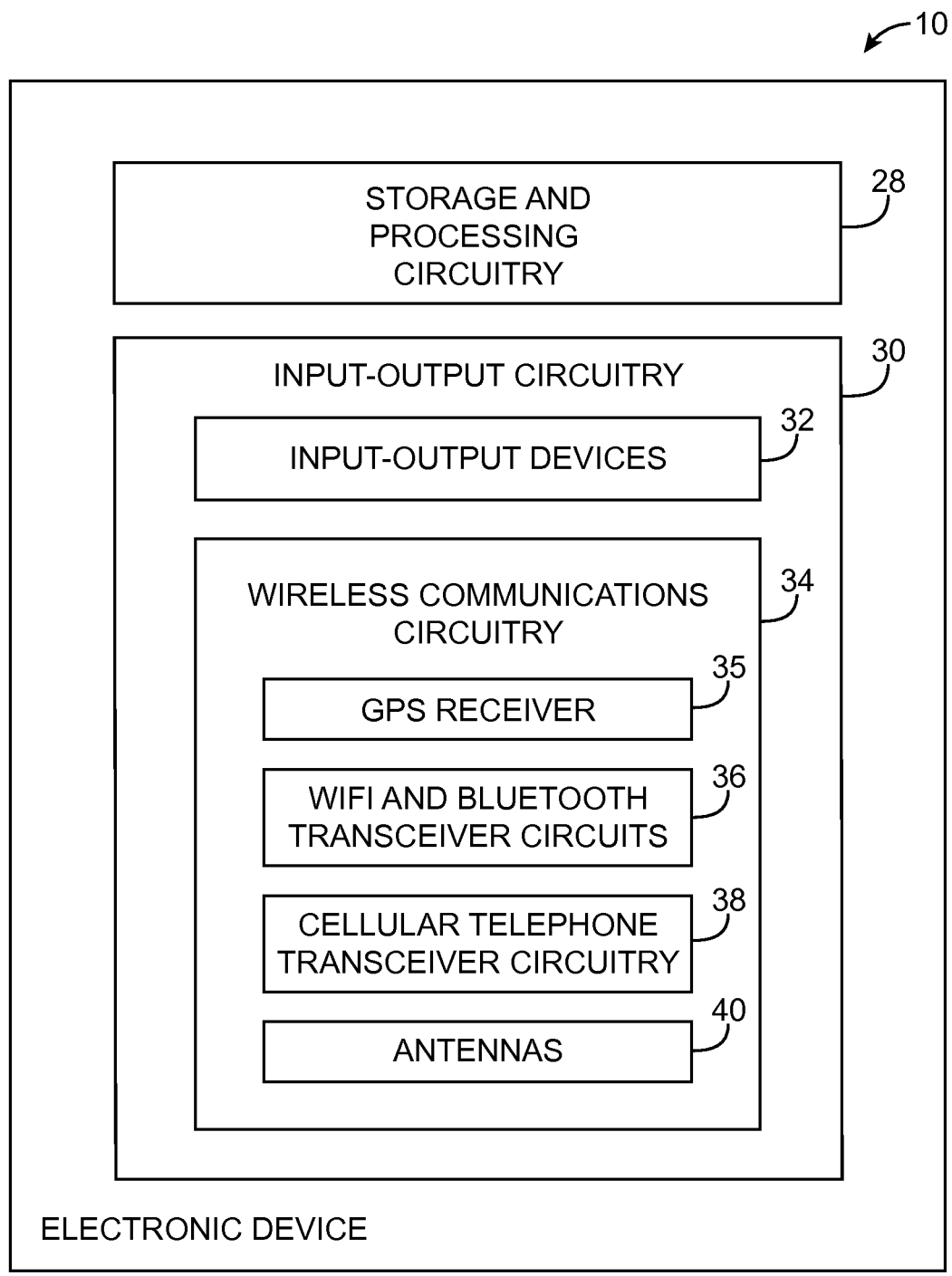
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and/or information on which communications bands are to be used in device 10, control which antenna structures within device 10 are being used to receive and process data and/or may adjust one or more switches, tunable elements, or other adjustable circuits in device 10 to adjust antenna performance. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, may tune an antenna to cover desired communications bands, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include global positioning system (GPS) receiver equipment or other satellite navigation system equipment, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

Figure 3:
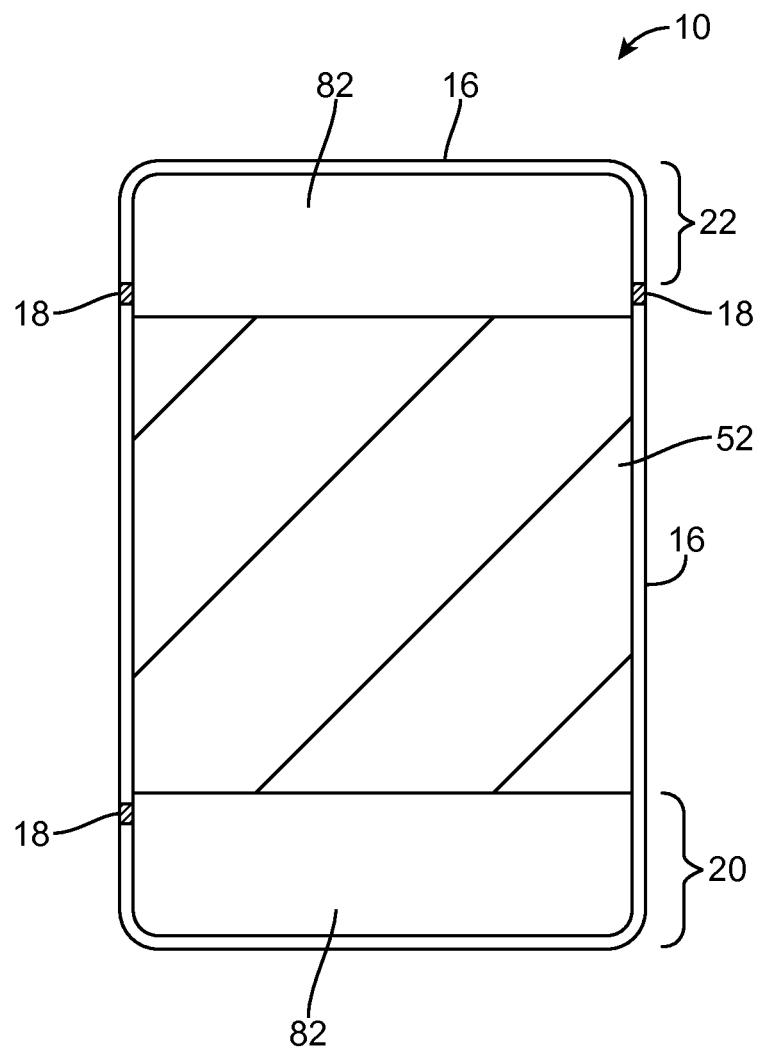
FIG. 3 is a diagram of an illustrative electronic device of the type shown in FIG. 1 showing how structures in the device may form a ground plane and other antenna structures in accordance with an embodiment of the present invention.

A top interior view of device 10 in a configuration in which device 10 has a peripheral conductive housing member such as housing member 16 of FIG. 1 with one or more gaps 18 is shown in FIG. 3. As shown in FIG. 3, device 10 may have an antenna ground plane such as antenna ground plane 52. Ground plane 52 may be formed from traces on printed circuit boards (e.g., rigid printed circuit boards and flexible printed circuit boards), from conductive planar support structures in the interior of device 10, from conductive structures that form exterior parts of housing 12, from conductive structures that are part of one or more electrical components in device 10 (e.g., parts of connectors, switches, cameras, speakers, microphones, displays, buttons, etc.), or other conductive device structures. Gaps such as gaps 82 may be filled with air, plastic, or other dielectric.

One or more segments of peripheral conductive member 16 may serve as part of the conductive structures for an antenna in device 10. For example, the lowermost segment of peripheral conductive member 16 in region 20 may serve as part of the conductive structures for an antenna in device 10. These structures may be provided with switches and other adjustable components or may be provided with fixed components. In arrangements in which an antenna is provided with adjustable components, the antenna may be tuned during operation to cover communications bands of interest. Tunable antennas 40 in device 10 may be implemented using antenna structures in region 22 and/or region 20. Illustrative tunable antenna structures of the type that may be used in region 20 are sometimes described herein as an example.

Figure 4:
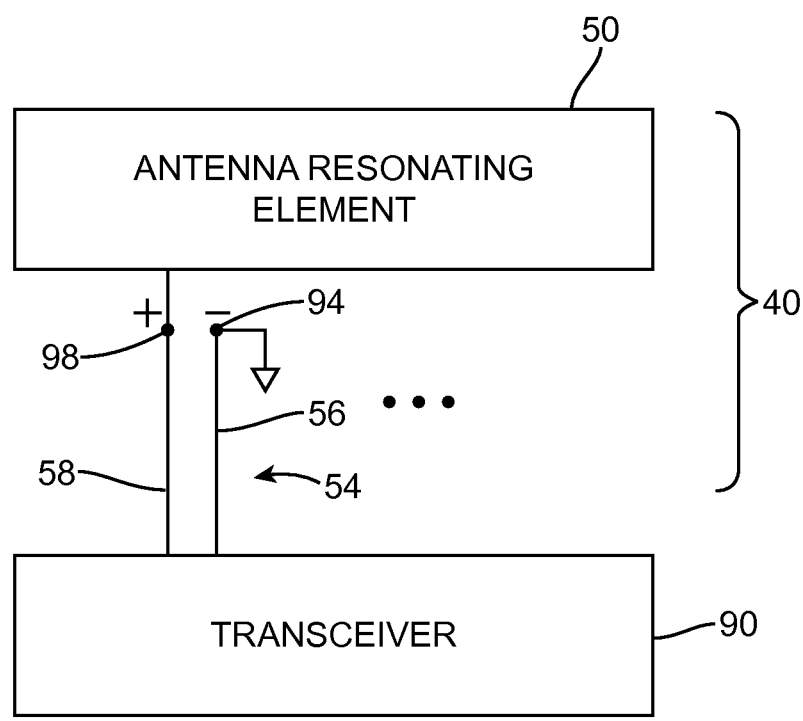
FIG. 4 is circuit diagram of illustrative wireless communications circuitry having a radio-frequency transceiver coupled to an antenna resonating element via a transmission line path in accordance with an embodiment of the present invention.

FIG. 4 is a diagram showing an antenna 40 that includes conductive antenna structures such as antenna resonating element 50 and antenna ground 52. The conductive structures that form antenna resonating element 50 and antenna ground 52 may be formed from parts of conductive housing structures, from parts of electrical device components in device 10, from printed circuit board traces, from strips of conductor such as strips of wire and metal foil, or other conductive materials.

As shown in FIG. 4, transceiver circuitry 90 (e.g., cellular telephone transceiver 38, wireless LAN transceiver 36, GPS receiver 35, etc.) may be coupled to one or more antennas such as antenna 40 using transmission line structures such as transmission line 54. Transmission line 54 may have positive signal path 58 and ground signal path 56. Paths 56 and 58 may be formed on rigid and flexible printed circuit boards, may be formed on dielectric support structures such as plastic, glass, and ceramic members, may be formed as part of a cable, etc. Transmission line 54 may be formed using one or more microstrip transmission lines, stripline transmission lines, edge coupled microstrip transmission lines, edge coupled stripline transmission lines, coaxial cables, or other suitable transmission line structures.

Transmission line 54 may be coupled to an antenna feed formed from antenna feed terminals such as positive antenna feed terminal 98 and ground antenna feed terminal 94. The conductive structures that form antenna resonating element 50 and antenna ground 52 may be used to form any suitable type of antenna. If desired, one or more of antennas 40 may be provided with multiple antenna feeds.

Figure 5:
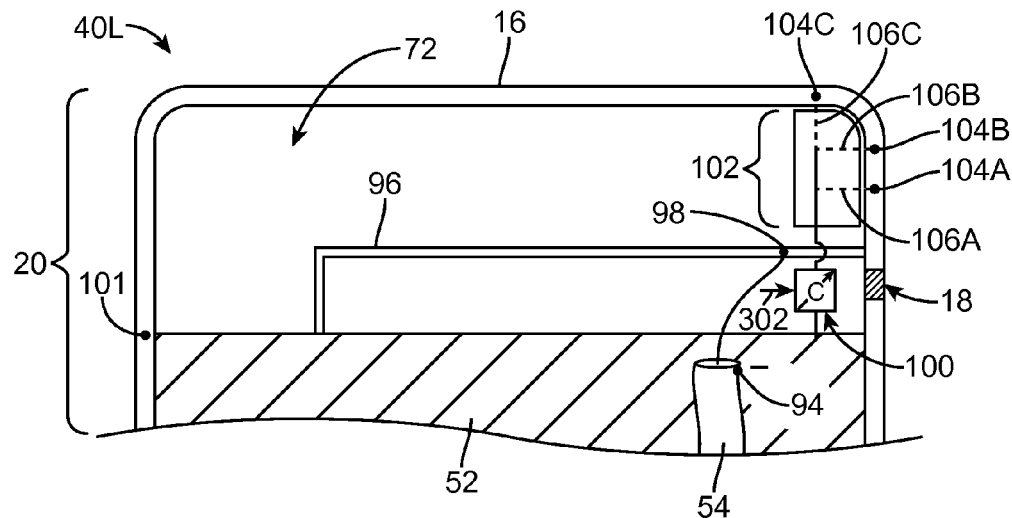
FIGS. 5 and 6 are diagrams of illustrative tunable antennas that include antenna tuning elements and associated custom antenna structures that may be used to adjust antenna performance and to compensate for manufacturing variations in accordance with an embodiment of the present invention.

An illustrative antenna 40 that has been implemented in region 20 of device 10 is shown in FIG. 5. Antenna 40 in lower region 20 (sometimes referred to as lower antenna 40L) may be formed using a parallel-fed loop antenna structure having a shape that is determined at least partly by the shape of the lower portions of ground plane 52 and a conductive arm formed from peripheral conductive housing member 16. The conductive path (arm) formed from peripheral conductive member 16 may be shorted to antenna ground 52 at one end (e.g., on the left-hand side of opening 72 at location 101) and may be separated from ground 52 at another end (e.g., at gap 18). Peripheral conductive arm 16 formed in this way may serve as the antenna resonating element for antenna 40L (as an example).

Gap 18 may give rise to a parasitic capacitance between the end of arm 16 and ground structure 52. The portion of conductive segment 16 that surrounds opening 72 and the portions of ground plane 52 that lie along the edge of opening 72 form a conductive loop around opening 72. The shape of opening 72 may be dictated by the placement of conductive structures in region 20 such as a microphone, flex circuit traces, a data port connector, buttons, a speaker, etc.

A conductive structure 96 may bridge dielectric opening 72 and may be used to electrically short ground plane 52 to peripheral conductive member 16. Conductive structure 96 may be formed using strips of conductive material, flex circuit traces, conductive housing structures, or other conductive structures. If desired, conductive structure 96 may be formed using discrete components such as surface mount technology (SMT) inductors.

Transmission line 54 (e.g., a coaxial cable) may be used to feed lower antenna 40L at positive and negative antenna feed terminals 98 and 94, respectively. Wireless transceiver circuitry (e.g., transceiver circuitry such as circuitry 90 of FIG. 4 or other suitable radio-frequency transceiver circuitry) may be coupled to the antenna feed via transmission line path 54 (e.g., a path that includes one or more transmission lines such as coaxial cable transmission lines, microstrip transmission lines, stripline transmission lines, or other transmission line structures). Impedance matching circuits, filters, switches, and other circuits may be interposed within path 54, if desired.

In one suitable embodiment of the present invention, wireless communications circuitry in device 10 may be provided with antenna tuning circuitry. The use of antenna tuning circuitry may help device 10 cover a wider range of communications frequencies than would otherwise be possible.

In general, it is desirable for device 10 to be able to exhibit wide band coverage (e.g., for device 10 to be able to support operation in multiple frequency bands corresponding to different radio access technologies). For example, it may be desirable for antenna 40 to be capable of operating in a higher frequency band that covers the GSM sub-bands at 1800 MHz and 1900 MHz and the data sub-band at 2100 MHz, a first lower frequency band that covers the GSM sub-bands at 850 MHz and 900 MHz, and a second lower frequency band that covers the LTE band at 700 MHz, the GSM sub-bands at 710 MHz and 750 MHz, the UMTS sub-band at 700 MHz, and other desired wireless communications bands.

The band coverage of antenna 40 may be limited by its volume (i.e., the amount of space that is occupied by antenna 40 within housing 12). For an antenna having a given volume, a higher band coverage (or bandwidth) results in a decrease in gain (e.g., the product of maximum gain and bandwidth is constant). As a result, increasing the volume of antenna 40 will generally increase its band coverage. Increasing the volume of antennas, however, may not always be feasible if a small form factor is desired.

To satisfy consumer demand for small form factor wireless devices, one or more of antennas 40 in device 10 may be provided with antenna tuning circuitry. The antenna tuning circuitry may include a radio-frequency tunable component such as tunable component (sometimes referred to as an adjustable antenna tuning element) 100 and associated control circuitry for adjusting the antenna tuning element. Tunable element 100 may sometimes be formed as an integral part of the antenna resonating element or as a separate discrete surface-mount component that is attached to the antenna resonating element.

For example, antenna tuning element 100 may include switching circuitry based on one or more switches or continuously tunable load components. Antenna tuning element may include a radio-frequency switch, a tunable resistive component, a tunable capacitive component, a tunable inductive component, and/or other suitable types of loading circuits. The associated control circuitry may be used to place antenna tuning element 100 in the desired state by sending appropriate control signals via path 302. The switching circuitry may, for example, include a switch that can be placed in an open or closed position. When the switch is placed in its open position (e.g., when control signal Vc has a first value), antenna 40 may exhibit a first frequency response. When the switch is placed in its closed position (e.g., when control signal Vc has a second value that is different than the first value), antenna 40 may exhibit a second frequency response. By using an antenna tuning scheme of this type, a relatively narrow bandwidth (and potentially compact) design can be used for antenna 40, if desired.

In the example of FIG. 5, antenna 40L may be provided with an antenna tuning element such as variable capacitor circuit 100. Variable capacitor circuit 100 (sometimes referred to as a varactor circuit, a tunable capacitor circuit, an adjustable capacitor circuit, a programmable array of capacitors, etc.) 212 may be coupled between opposing ends of peripheral conductive member gap 18.

Gap 18 may, for example, have an intrinsic capacitance of 1 pF (e.g., an inherent capacitance value formed by the parallel conductive surfaces at gap 18). Component 100 may be, for example, a continuously variable capacitor, a semi-continuously adjustable capacitor that has two to four or more different capacitance values that can be coupled in parallel to the intrinsic capacitance. If desired, component 100 may be a continuously variable inductor or a semi-continuously adjustable inductor that has two or more different inductance or resistance values. In some embodiments, component may be a fixed component that exhibits a constant load. Component 100 may be formed from using integrated circuits, one or more discrete components (e.g., SMT components), etc.

In one suitable arrangement, antenna tuning element 100 may have a first terminal that is coupled to ground plane 52 and a second terminal that is coupled to a portion of conductive member 16 via custom structures 102 (e.g., so that component 100 bridges gap 18). Custom structures 102 (sometimes referred to as custom antenna structures) may serve to connect the second terminal of tunable element 100 to a desired location on arm 16 via a customized path. For example, custom structures 102 may be manufactured so that a conductive line or other path takes the route illustrated by path 106A (e.g., to couple the second terminal of element 100 to location 104A on arm 16), may be manufactured so that a conductive line or other path takes the route illustrated by path 106B (e.g., to couple the second terminal of element 100 to location 104B on arm 16), or may be manufactured so that a conductive line or other path takes the route illustrated by path 106C (e.g., to couple the second terminal of element 100 to location 104C on arm 16). The decision as to which configuration to use for custom structure 102 may be made based on the results of characterization operations in which the antenna performance of representative devices 10 is measured.

Due to manufacturing variations, conductive antenna material shapes and sizes may be inadvertently altered, leading to variations in an antenna's frequency response relative to a desired nominal frequency response. These unavoidable manufacturing variations may arise due to the limits of manufacturing tolerances (e.g., the limited ability to machine metal parts within certain tolerances, the limited ability to manufacture printed circuit board traces with desired conductivities and line widths, trace thickness, etc.). The use of custom antenna structures 102 may help to compensate for such types of undesired manufacturing variations.

In general, changes to the location at which antenna tuning element 100 connects to conductive resonating arm 16 affects antenna performance. In particular, the frequency response of the antenna (characterized, as an example, by a standing wave ratio plot as a function of operating frequency in FIG. 7) will exhibit changes at various operating frequencies. In some situations, the antenna will become more responsive at a given frequency and less responsive at another frequency.

Figure 7:
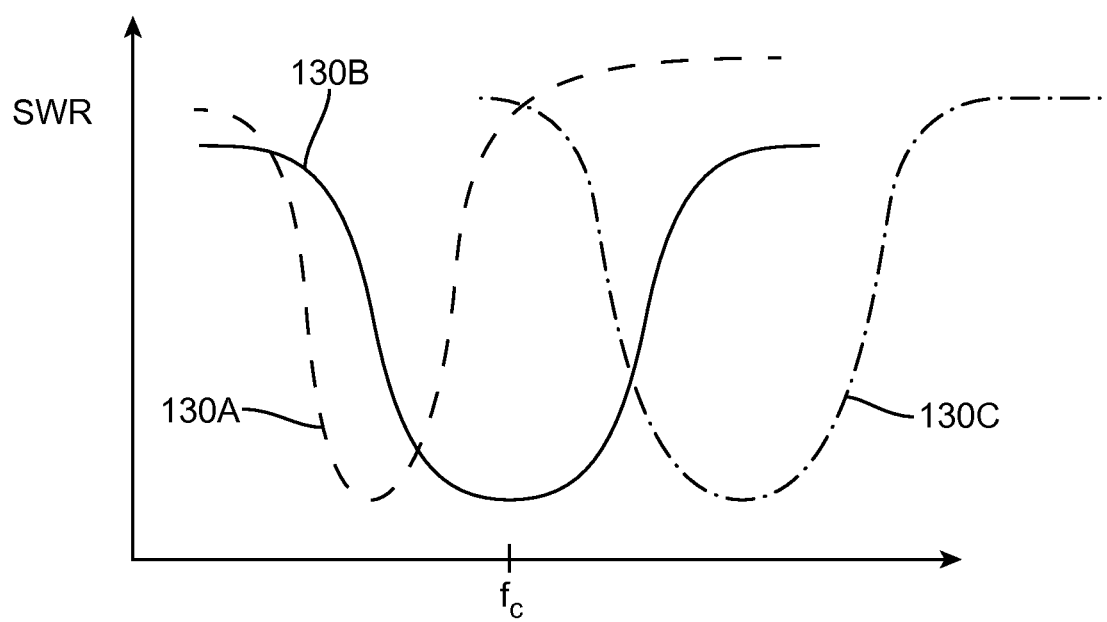
FIG. 7 is a graph of antenna performance associated with use of different custom antenna structures in accordance with an embodiment of the present invention.

As shown in FIG. 7, curve 130A may represent a first frequency response when tuning element 100 contacts arm 16 at position 104A; curve 130B may represent a second frequency response when tuning element 100 contacts arm 16 at position 104B; and curve 130C may represent a third frequency response when tuning element 100 contacts arm 16 at position 104C. In this example, custom structure 102 with custom path 106B may be selected as the desired antenna configuration for manufacturing assuming the desired frequency band of operation is centered at frequency fc (since curve 130B exhibits a resonant peak that coincides best with frequency fc). In other words, a suitable mechanical location for the placement of antenna tuning element 100 within device 10 may be chosen based on characterization of antenna performance. Once the location has been determined, structures for assembling antenna tuning element 100 within device 10 may then be co-designed with peripheral conductive arm 16 and/or other parts of device housing 12.

Custom antenna structures 102 may be formed from fixed (non-adjustable) structures that are amenable to mass production. Custom structures 102 may, for example, be implemented using springs, clips, wires, brackets, machined metal parts, conductive traces such as metal traces formed on dielectric substrates such as plastic members, printed circuit board substrates, layers of polymer such as polyimide flex circuit sheets, combinations of these conductive structures, conductive elastomeric materials, spring-loaded pins, screws, interlocking metal engagement structures, other conductive structures, or any combination of these structures. Custom structures 102 may be mass produced in a fixed configuration (once an appropriate configuration for custom structures 102 been determined) and the mass produced custom structures may be included in large batches of devices 10 as part of a production line manufacturing process (e.g. a process involving the manufacture of thousands or millions of units). Custom structures used as such may therefore serve to improve antenna performance and to help compensate for manufacturing/assembly variations.

Figure 6:
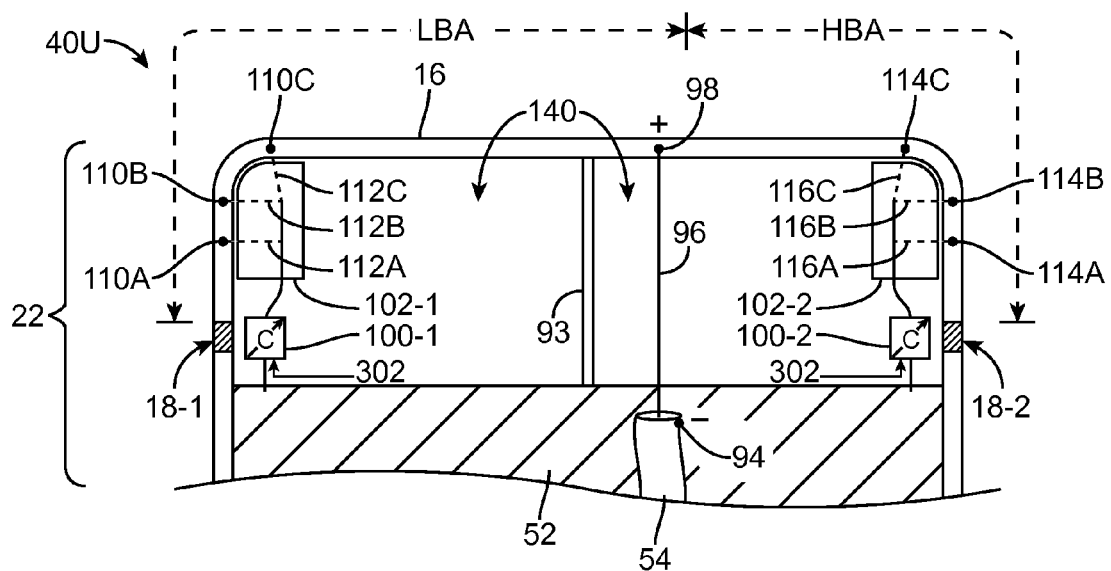

An illustrative antenna 40 that has been implemented in region 22 of device 10 is shown in FIG. 6. Antenna 40 in upper region 22 (sometimes referred to as upper antenna 40U) may be a two-branch inverted-F antenna (as an example). Transmission line 54 may be used to feed antenna 40U at antenna feed terminals 98 and 94. Conductive structure 96 may be bridge dielectric opening 140 and may be used to electrically short ground plane 52 to peripheral housing member 16. Wireless transceiver circuitry (e.g., transceiver circuitry such as circuitry 90 of FIG. 4 or other suitable radio-frequency transceiver circuitry) may be coupled to the antenna feed via transmission line path 54. Impedance matching circuits, filters, switches, and other circuits may be interposed within path 54, if desired.

Peripheral conductive segment 16 may form antenna resonating element arms for antenna 40U. In particular, a first portion of segment 16 (having arm length LBA) may extend from feed point 98 to the left end of segment 16 that is defined by gap 18-1 and a second portion of segment 16 (having arm length HBA) may extend from feed point 98 to the right end of segment 16 that is defined by gap 18-2. The first and second portions of segment 16 may form respective branches of an inverted F antenna and may be associated with respective low band (LB) and high band (HB) antenna resonances for antenna 40U.

Antenna 40U may also be provided with antenna tuning circuitry such as antenna tuning element 100-1 and antenna tuning element 100-2. Antenna tuning element 100-1 may be coupled between opposing ends of gap 18-1, whereas antenna tuning element 100-2 may be coupled between opposing ends of gap 18-2. Antenna tuning elements 100-1 and 100-2 may be continuously variable capacitive circuits or semi-continuously adjustable capacitive circuits having two to four or more different capacitance values that can be coupled in parallel to the intrinsic capacitance (as an example). If desired, components 100-1 and 100-2 may be continuously variable inductive circuits or semi-continuously adjustable inductive circuits having two or more different inductance or resistance values. Components 100-1 and 100-2 may be formed from using integrated circuits, one or more discrete components (e.g., SMT components), etc. Components 100-1 and 100-2 may be placed in the desired state by sending appropriate control signals via path 302.

In the example of FIG. 6, tunable element 100-1 may have a first terminal that is coupled to ground and a second terminal that is coupled to a desired location on arm 16 via custom structure 102-1. Structure 102-1 may either have a first custom (fixed) configuration that couples element 100-1 to a first position 110A on arm 16 via path 112A, a second custom (fixed) configuration that couples element 100-1 to a second position 110B on arm 16 via path 112B, or a third custom (fixed) configuration that couples element 100-1 to a third position 110C on arm 16 via path 112C. Similarly, tunable element 100-2 may have a first terminal that is coupled to ground and a second terminal that is coupled to a desired location on arm 16 via custom structure 102-2. Structure 102-2 may either have a first custom (fixed) configuration that couples element 100-2 to a first position 114A on arm 16 via path 116A, a second custom (fixed) configuration that couples element 100-2 to a second position 114B on arm 16 via path 116B, or a third custom (fixed) configuration that couples element 100-3 to a third position 114C on arm 16 via path 116C.

Custom structures 102 (e.g., custom antenna tuning element connector structures 102-1 and 102-2) may be designed based on the results of characterization operations in which the antenna performance of representative devices 10 is measured. In general, the custom structures 102 that provide antenna 40 with the optimum frequency response will be selected as the custom antenna configuration to be manufactured on a production line involving the manufacture of thousands or millions of units.

As describe previously in connection with FIG. 5, custom antenna tuning element connector structures 102-1 and 102-2 may be implemented using springs, clips, wires, brackets, machined metal parts, conductive traces such as metal traces formed on dielectric substrates such as plastic members, printed circuit board substrates, layers of polymer such as polyimide flex circuit sheets, combinations of these conductive structures, conductive elastomeric materials, spring-loaded pins, screws, interlocking metal engagement structures, other conductive structures, or any combination of these structures.

The examples in FIGS. 5 and 6 in which antenna tuning element 100 is coupled across gap 18 in peripheral conductive housing member 16 is merely illustrative and does not serve to limit the scope of the present invention. If desired, antenna tuning element 100 may be interposed in any conductive path that is part of antenna 40 and may be coupled to any portion of device 10 that can affect antenna performance. Custom structures 102 associated with such type of antenna tuning component may serve to couple the antenna tuning element 100 to a desired custom location within device 10 so as to optimize for RF performance and to compensate for manufacturing variations.

Figure 8:
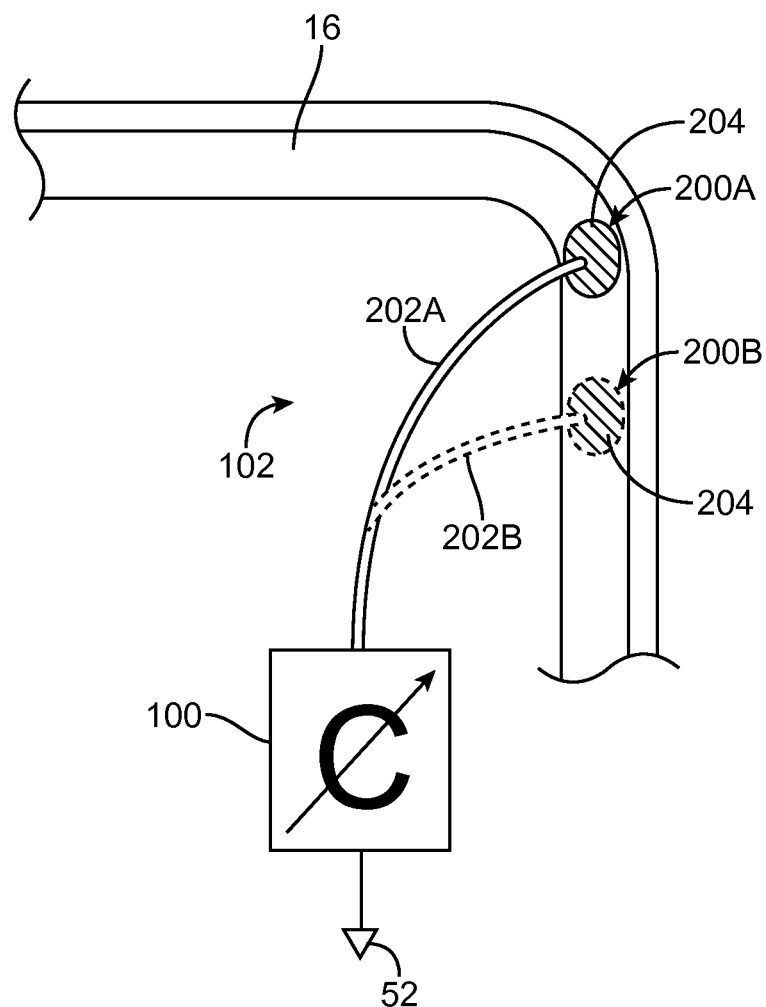
FIG. 8 is a diagram showing how an antenna tuning element may be soldered to different portions of an antenna to adjust antenna performance to compensate for manufacturing variations in accordance with an embodiment of the present invention.

In one suitable arrangement, custom connector structure 102 may be a wire that is soldered or otherwise attached to an inner surface of peripheral conductive member 16 (see, e.g., FIG. 8). As shown in FIG. 1, the second terminal of antenna tuning element 100 may be connected to location 200A on member 16 via a wired path such as wire 202A. For example, wire 202A may be attached to member 16 at location 200A using solder 204. This is merely illustrative. Wire 202A may be attached to member 16 via a screw, hook, conductive adhesive, or other suitable types of connective mechanism. If desired, the second terminal of element 100 may be coupled to another location 200B on member 16 (as indicated by dashed path 202B). The location at which element 100 connects to member 16 should be determined based on which configuration provides the most desirable antenna performance.

Figure 9:
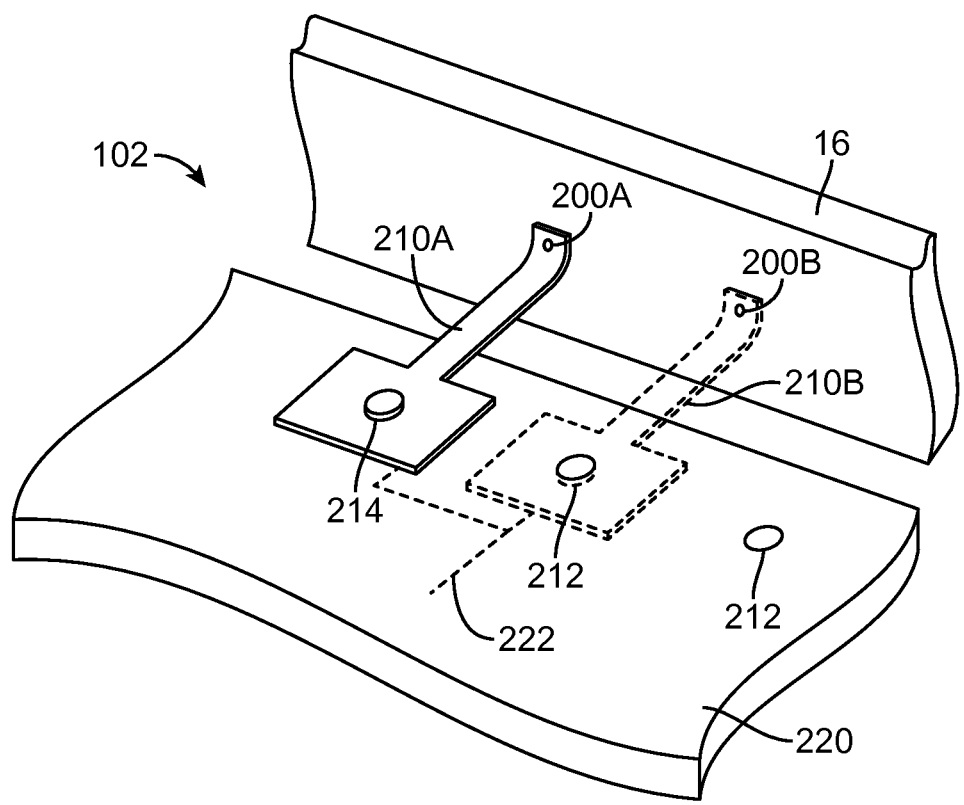
FIG. 9 is a perspective view of an illustrative custom antenna structure based on a spring that may be attached to a printed circuit board or other structure at different positions to adjust antenna performance to compensate for manufacturing variations in accordance with an embodiment of the present invention.

FIG. 9 is a perspective view of another suitable arrangement that may be used for antenna 40 in device 10 in which custom antenna structures 102 have been implemented using a spring member. As shown in FIG. 9, the custom structures 102 may include a substrate 220 having an array of holes 212 into which a screw such as screw 214 or other engagement structure may be received. Custom structures 102 may also include a spring that can be attached to various positions along the edge of substrate 220 using screw 214.

In the position shown in FIG. 9, spring 210A couples the second terminal (e.g., terminal 222) of antenna tuning element 100 to peripheral conductive member 16 at location

200A. In the position indicated by dashed line 210B, the spring couples terminal 222 to peripheral conductive member 16 at location 200B (i.e., a different custom location). If desired, solder, welds, or other fastening mechanisms may be used instead of screw 214 or in addition to screw 214 to form an electrical connection between structures 102 and terminal 222 of antenna tuning element 100.

Figure 10:
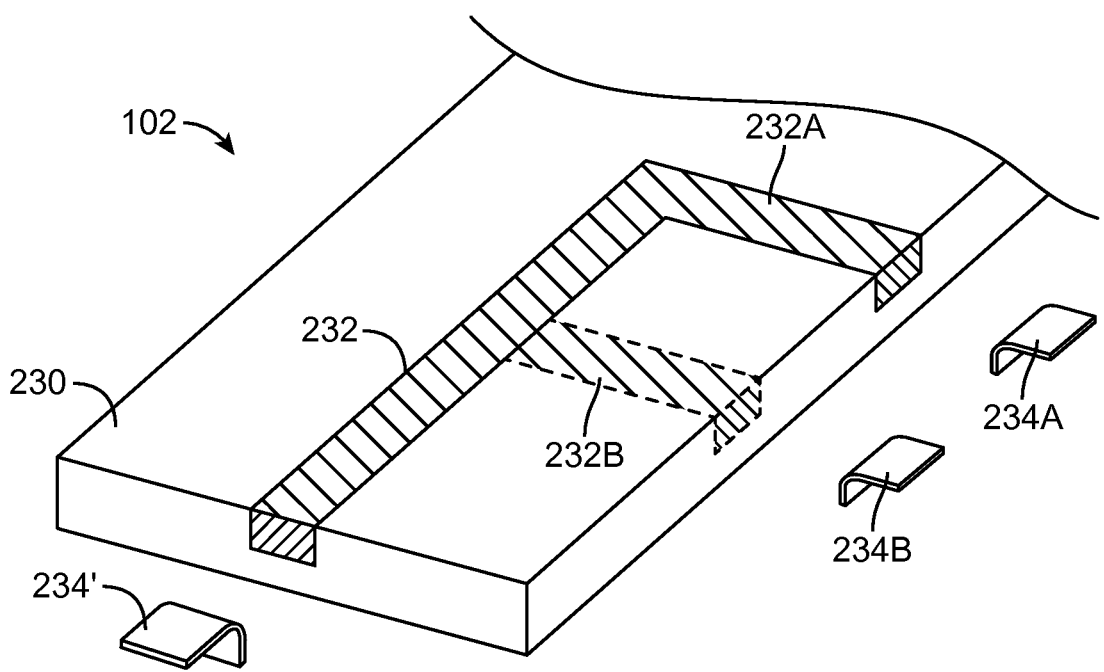
FIG. 10 is a diagram showing how a path on a dielectric support structure such as a plastic support may be customized to form different antenna paths and thereby adjust antenna performance to compensate for manufacturing variations in accordance with an embodiment of the present invention.

If desired, customized conductive paths within custom structures 102 may be formed on a plastic support or other dielectric support and springs may be used to form connections to the customized conductive paths. FIG. 10 illustrates an illustrative arrangement of this type that may be used in implementing customized antenna structures 102.

When custom structures 102 have the configuration shown in FIG. 10, conductive path 232 formed in a support structure 230 will connect spring 234' to spring 234A (via path 232A). Spring 234' may be connected to the second terminal of antenna tuning element 100. Spring 234A may be connected to conductive peripheral member 16 at a first custom location. If desired, conductive path 232 may instead be configured to couple spring 234' to spring 234B (via path 232B). Spring 234B may be connected to conductive peripheral member 16 at a second custom location that is different than the first custom location.

Conductive paths such as path 232 on custom structures 102 of FIG. 10 may be formed using a combination of fixed and customizable electrical structures. For example, fixed contacts may be formed that line up with springs 234', 234A, and 234B. A portion of path 232 that runs between the fixed contact pads can be customized (e.g., using laser sensitization and selective metal deposition, using laser trimming, using screen printing, using pad printing, using spraying, etc.). Paths 232 with different shapes may also be formed using different shadow masks, photolithographic masks, by screen printing patterns, by spraying, by pad printing patterns, by stamping metal foil and attaching patterned foil to a support structure such as structure 230 with adhesive, etc.

The custom antenna connector structures of the type shown in FIGS. 8-10 are merely illustrative and do not serve to limit the scope of the present invention. If desired, the custom structures may be formed using any combination of conductive and dielectric material for coupling the antenna tuning element to two or more desired custom locations on peripheral conductive member 16. In some devices, a custom antenna structure with one configuration may be used to compensate antenna 40 for manufacturing variations that affect antenna performance, whereas in other devices a custom antenna structure with a different configuration may be used to compensate antenna 40 for a different set of manufacturing variations.

Figure 11:
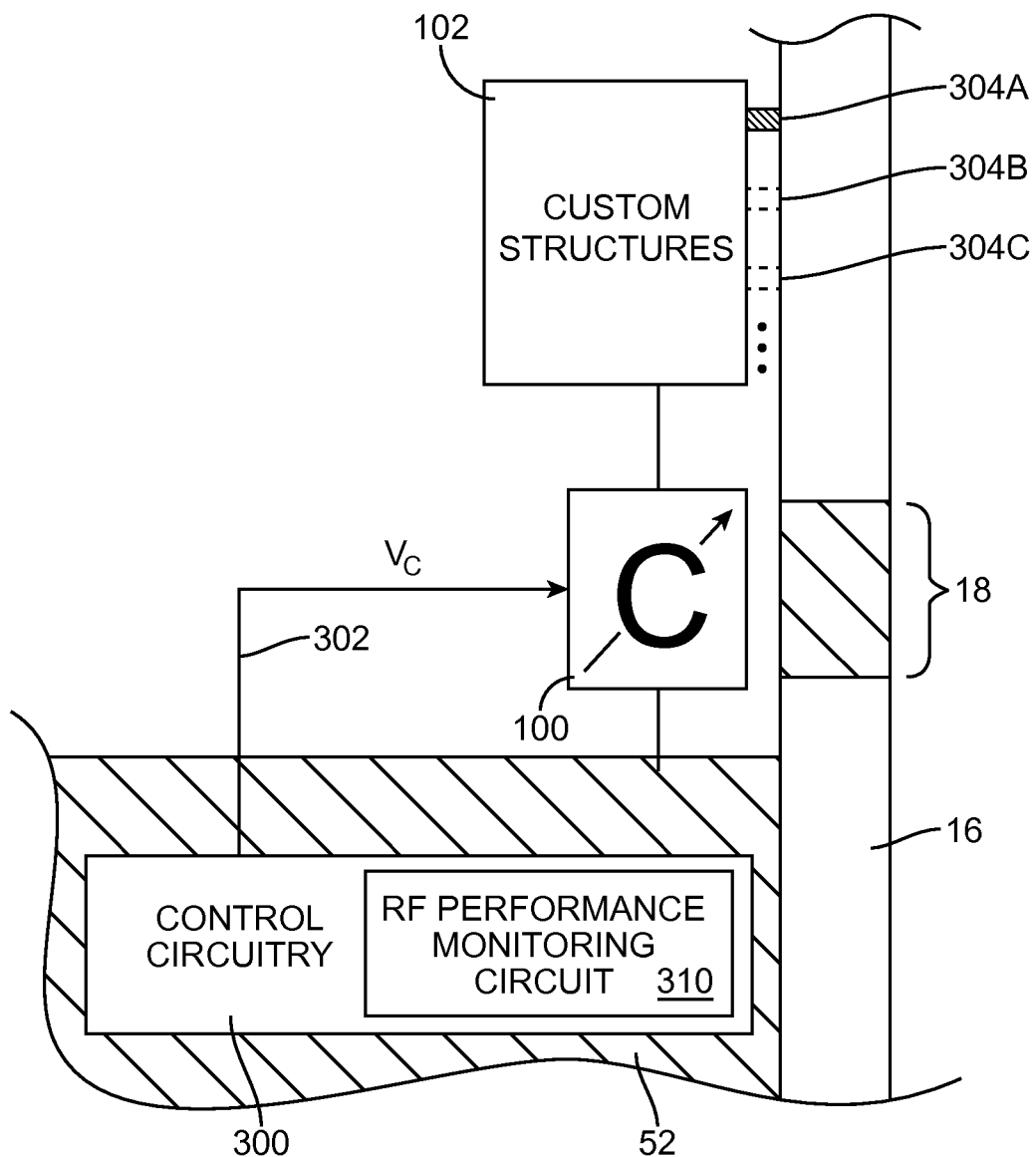
FIG. 11 is a diagram of an illustrative antenna tuning element that can be adjusted in real time during normal operation to improve antenna performance in accordance with an embodiment of the present invention.

FIG. 11 shows how antenna tuning element such as tunable capacitive circuit 100 may receive control signal Vc from associated control circuitry 300. Control circuitry 300 may sometimes be considered to be part of storage and processing circuitry 28 (see, FIG. 2) and may include an RF performance monitoring circuit 310. Radio-frequency performance monitoring circuit 310 may be used during normal operation to monitor a given RF performance metric reflective of the current antenna performance of device 10. For example, circuit 310 may be used to monitor the current power efficiency of antenna 40, the return loss of antenna 40, the frequency response of antenna 40, and/or other suitable RF performance metric. Control circuitry 300 may control signal Vc based on data gathered by circuit 310 to adjust the state of antenna tuning element 100 in real time to optimize for wireless performance.

As shown in FIG. 16, antenna tuning element 100 may have a first terminal connected to one end of gap 18, a second terminal connected to another end of gap 18 via custom structures 102, and a third terminal that receives control signal Vc. Custom structures 102 may serve as a fixed (non-adjustable) connector that electrically and physically connects the second terminal of element 100 to one of many possible custom locations (e.g., locations 304A, 304B, 304C, etc.) on peripheral conductive member 16 to provide optimal antenna performance and compensate for manufacturing variations.

Control circuitry 300 may set Vc to different analog or digital levels to adjust the impedance of antenna tuning element 100. The adjustments can be made in either discrete of continuous steps in real time to help cover multiple frequency bands and/or to compensate for assembly/manufacturing variations. By using antenna tuning schemes of this type, antenna(s) 40 in device 10 may be able to cover a wider range of communications frequencies than would otherwise be possible.

Figure 12:
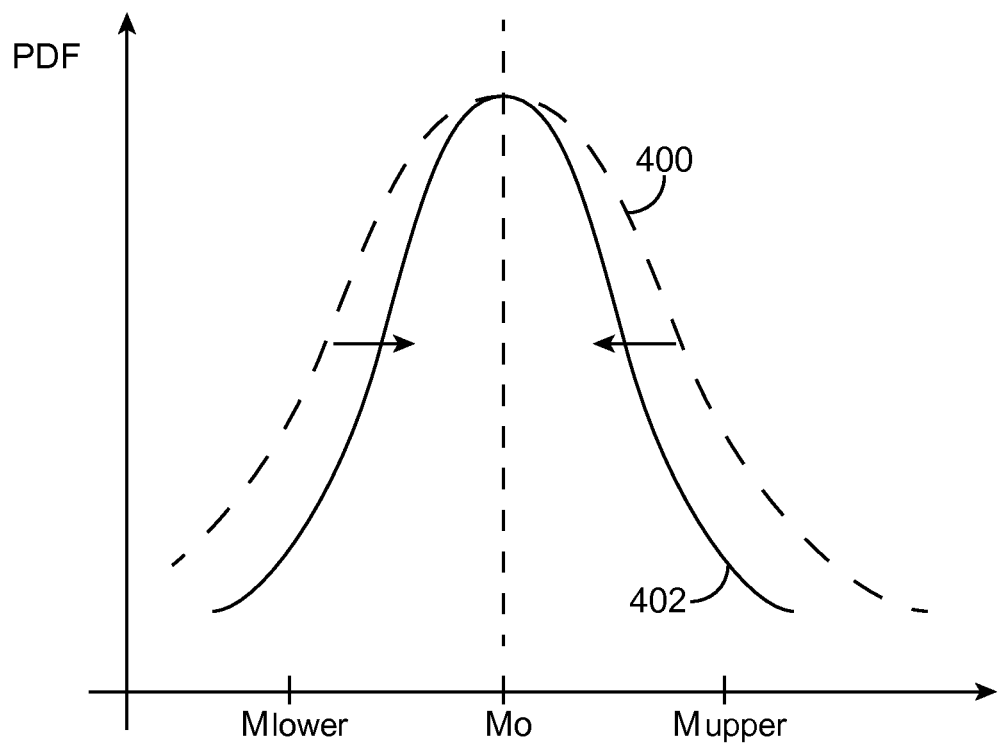
FIG. 12 is a plot illustrating how use of an antenna tuning element can help improve production yield in accordance with an embodiment of the present invention.

FIG. 12 is a probability distribution function (PDF) plot showing how the use of custom structures 102 can help improve production yield. In the example of FIG. 12, curve 400 may represent the PDF for production units 10 without any adjustments to custom structures 102, whereas curve 402 may represent the PDF for production units 10 with custom structures 102 that are optimized for antenna performance and that have been adjusted to compensate for manufacturing variations.

As shown in FIG. 12, curve 402 exhibits less variance than curve 400 for a given radio-frequency performance metric centered about Mo. Design criteria may specify that the number of units exhibiting a metric less than a lower bound limit Mlower and that the number of units exhibiting a metric greater than an upper bound limit Mupper to be less than a predetermined threshold. The use of custom structures 102 to help produce a "narrower" curve with fewer samples lying outside of the acceptable range defined by Mlower and Mupper therefore helps to achieve a higher production yield.

Figure 13:
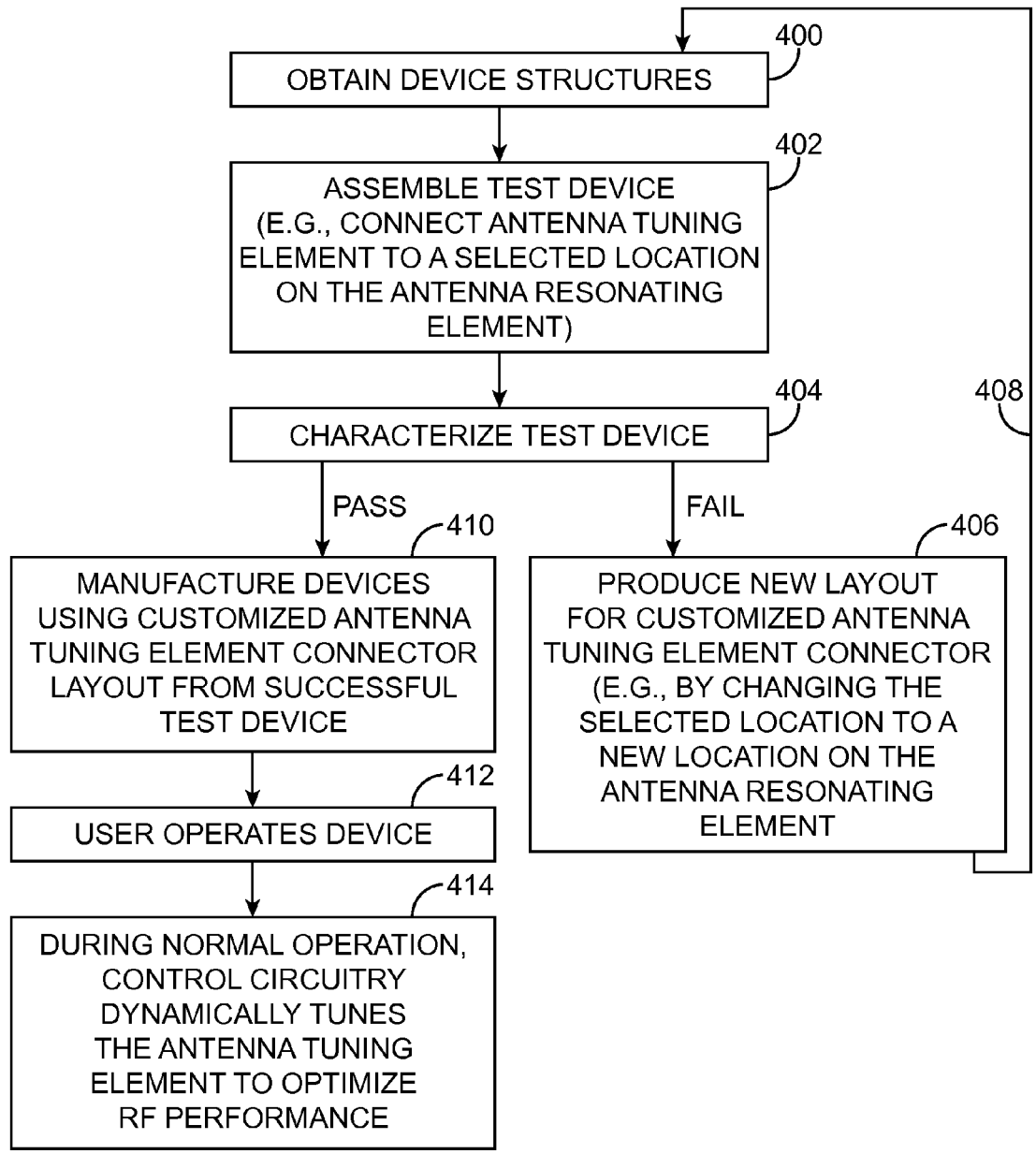
FIG. 13 is a flow chart of illustrative steps involved in characterizing antenna performance in electronic devices formed from a set of components and compensating for manufacturing variations by customizing connector structures associated with antenna tuning elements in accordance with an embodiment of the present invention.

FIG. 13 is a flow chart of illustrative steps involved in manufacturing devices that include custom antenna structures 102.

At step 400, parts for a particular design of device 10 may be manufactured and collected for assembly. Parts may be manufactured by numerous organizations, each of which may use different manufacturing processes. As a result, there may be manufacturing variations in the parts that can lead to undesirable variations in antenna performance if not corrected.

At step 402, a manufacturer of device 10 may assemble the collected parts to form one or more test versions of device 10. A typical manufacturing line may produce thousands or millions of nominally identical units of device 10. Production may take place in numerous batches. Batches may involve thousands of units or more that are assembled from comparable parts (i.e., parts made using identical or similar manufacturing processes). Batch-to-batch variability in antenna performance is therefore typically greater than antenna performance variability within a given batch.

After assembling a desired number of test devices at step 402 (e.g., one or more test devices representative of a batch of comparable devices), the test devices may be characterized at step 404. For example, the frequency response of the antenna in each of the test devices can be measured to determine whether there are frequency response curve shifts and other variations between devices (i.e., between batches).

When assembling test devices at step 402, custom antenna structures 102 or other such structures with a particular configuration may be used. If test results from the characterization operations of step 404 reveal that antenna performance is deviating from the desired nominal performance (i.e., if there is a frequency shift or other performance variation), appropriate custom antenna structures 102 may be installed in the test devices (i.e., structures with a different trial pattern for conducting antenna tuning element 100 to peripheral conductive member 16). As indicated by line 408, the custom antenna structures 102 and other device structures may be assembled to produce new versions of the test devices (step 402) and may be tested at step 404. If testing reveals that additional modifications are needed, different custom antenna structures 116 may again be identified and installed in the test device(s).

Once testing at step 404 reveals that the test devices are performing satisfactorily with a given type of customized antenna structures 102, that same type of customized antenna structures 102 (i.e., structures that connect antenna tuning element 100 to an identical custom location on member 16) may be selected for incorporation into production units.

With this approach, structures 102 with an appropriate custom configuration for the conductive portions of structures 102 may be identified from the test characterization measurements of step 404 and structures 102 with that selected configuration may be installed in numerous production devices during the production line manufacturing operations of step 410. In a typical scenario, once the proper customization needed for structures 102 within a given batch has been identified (i.e., once the proper customized antenna structures for optimizing antenna performance and for compensating for manufacturing variations have been selected from a plurality of different possible customized antenna structures), all devices 10 within that batch may be manufactured using the same custom antenna structures 102.

Because the custom antenna structures were selected so as to optimize for wireless performance and to compensate for manufacturing variations, the electronic devices produced at step 410 that include the custom antenna structures will perform as expected (i.e., the antenna frequency response curves for these manufactured devices will be accurate and will be properly compensated by the customized antenna structures for manufacturing variations). As each new batch is assembled, the customization process may be repeated to identify appropriate custom structures 102 for manufacturing that batch of devices. The custom antenna structures may have fixed (non-adjustable) configurations suitable for mass production.

Devices manufactured using customized antenna structures with a passing layout may be provided to a user for normal operation (step 412). At step 414, control circuitry 300 may dynamically adjust antenna tuning element 100 to optimize for RF performance based on periodic or aperiodic measurements obtained using RF performance monitoring circuit 310 (see, e.g., FIG. 11). The custom structures 102 in each batch of devices have identical configurations, whereas the custom structures 102 may be different from batch to batch. All devices 10 may be adjusted in real time to optimize for antenna performance (e.g., antenna tuning element 100 may be dynamically adjusted to help improve wireless communications, to help compensate for variations in temperature/voltage and other operating conditions, etc.).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
    an antenna that is formed from an antenna ground and a portion of a conductive member;
    a transceiver that is coupled to the conductive member;
    an antenna tuning element for tuning antenna performance of the antenna, wherein the antenna tuning element has a first terminal that is coupled to the antenna ground and a second terminal that is coupled to the conductive member; and
    custom antenna structures that compensate for manufacturing variations that affect the antenna performance of the antenna, wherein the custom antenna structures include a custom conductive path that connects the second terminal of the antenna tuning element to the conductive member at a selected one of a plurality of custom locations on the conductive member, the antenna tuning element and the custom antenna structures bridge a dielectric opening between the conductive member and the antenna ground, the custom antenna structures include a dielectric support on which at least part of the custom conductive path is formed, and the antenna tuning element is not formed on the dielectric support.

2. The electronic device defined in claim 1, wherein the antenna tuning element comprises at least one adjustable circuit selected from the group consisting of: a radio-frequency switch, a tunable resistive component, a tunable capacitive component, and a tunable inductive component.

3. The electronic device defined in claim 1, wherein the electronic device has a periphery, and wherein the conductive member is formed at least partly from conductive structures disposed along the periphery.

4. The electronic device defined in claim 3, wherein the conductive member comprises at least one gap that divides the conductive member into a plurality of segments, and wherein the portion includes at least one of the plurality of segments.

5. The electronic device defined in claim 1, wherein the custom antenna structures include a wire having a first end that is connected to the antenna tuning element and a second end that is attached to the conductive member at the selected one of the plurality of custom locations.

6. The electronic device defined in claim 1, wherein the custom antenna structures comprise at least one spring associated with the custom conductive path.

7. A method for manufacturing a wireless electronic device, comprising:
    forming conductive antenna structures that form an interior surface and an exterior surface of the wireless electronic device;
    coupling an antenna tuning element to the conductive antenna structures; and
    forming custom antenna structures, wherein the antenna tuning element is coupled to a portion of the conductive antenna structures through the custom antenna structures, the custom antenna structures are selected from a plurality of different custom antenna structures, each of the plurality of different custom antenna structures has a fixed configuration that compensates for manufacturing variations in the conductive antenna structures, and each of the plurality of custom antenna structures electrically couples to the conductive antenna structures at a different respective locations along the interior surface.

8. The method defined in claim 7, wherein the wireless electronic device has a periphery, and wherein forming the conductive antenna structures comprises forming the conductive antenna structures at least partly from a conductive peripheral member that runs along the periphery.

9. The method defined in claim 8, further comprising:
forming an electrical connection between the conductive peripheral member and a transmission line conductor associated with a transceiver in the wireless electronic device.

10. The method defined in claim 8, wherein the conductive peripheral member comprises at least one gap that divides the peripheral conductive member into a plurality of segments, the method further comprising:
coupling the antenna tuning element between opposing ends of the at least one gap.

11. The method defined in claim 7, further comprising:
testing a plurality of representative wireless electronic devices to determine which of the plurality of different custom antenna structures to select when manufacturing the wireless electronic device.

12. The method defined in claim 7, further comprising:
forming control circuitry within the wireless electronic device, wherein the control circuitry is configured to adjust the antenna tuning element during normal operation of the wireless electronic device.

13. The method defined in claim 7, wherein forming the custom antenna structures comprises forming a customized conductive path on a plastic support structure.

14. The method defined in claim 7, further comprising:
coupling a transceiver to the conductive antenna structure via a transmission line, wherein the custom antenna structures is not interposed in the transmission line.

15. An electronic device, comprising:
an antenna that is formed from an antenna ground and a portion of a conductive member;
a transceiver that is coupled to the conductive member;
an antenna tuning element for tuning antenna performance of the antenna, wherein the antenna tuning element has a first terminal that is coupled to the antenna ground and a second terminal that is coupled to the conductive member; and
custom antenna structures that compensate for manufacturing variations that affect the antenna performance of the antenna, wherein the custom antenna structures include a custom conductive path that connects the second terminal of the antenna tuning element to the conductive member at a selected one of a plurality of custom locations on the conductive member, the antenna tuning element and the custom antenna structures bridge a dielectric opening between the conductive member and the antenna ground, the first terminal of the antenna tuning element is directly connected to the antenna ground, and the second terminal of the antenna tuning element is directly connected to the custom conductive path of the custom antenna structures.

16. The wireless electronic device defined in claim 15, further comprising:
a conductive structure that is connected between the conductive member bridges and the antenna ground and that bridges the dielectric opening; and
a transmission line having a signal conductor connected to the conductive structure that is configured to convey radio-frequency signals for the antenna, wherein the second terminal of the antenna tuning element is directly connected to the custom conductive path over the conductive structure.

* * * * *